United States Patent [19]

Thomas

[11] Patent Number: 4,607,823
[45] Date of Patent: Aug. 26, 1986

[54] APPARATUS FOR REMOVING TRUCK BRAKE DRUM

[76] Inventor: Roy E. Thomas, 3523 W. Las Palmaritas, Phoenix, Ariz. 85021

[21] Appl. No.: 584,154

[22] Filed: Feb. 27, 1984

[51] Int. Cl.⁴ ............................................. B66F 3/00
[52] U.S. Cl. .......................... 254/134; 254/DIG. 16
[58] Field of Search .............. 254/133, 134, DIG. 16; 269/17, 296

[56] References Cited

U.S. PATENT DOCUMENTS 2,748,459  6/1956  Orr ..................................... 254/134

Primary Examiner—Robert C. Watson
Attorney, Agent, or Firm—Drummond & Nissle

[57] ABSTRACT

Apparatus for maintenancing the brake drum carried by the spindle of a wheel axle assembly. The apparatus reduces both the time required to maintenance a brake drum and the likelihood that bearings and bearing seals in the brake drum will be damaged when the drum is removed from its spindle.

2 Claims, 4 Drawing Figures

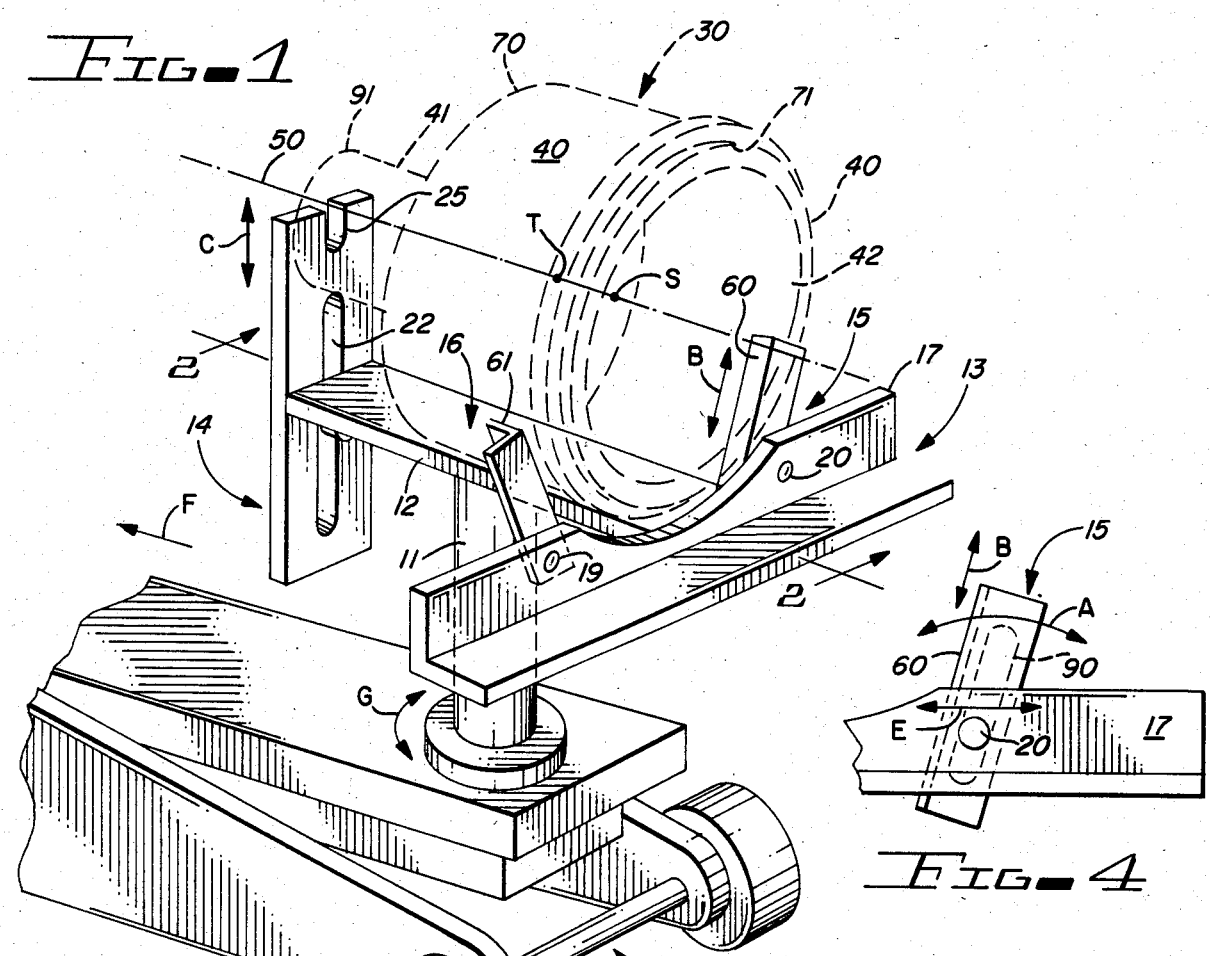
Fig-1
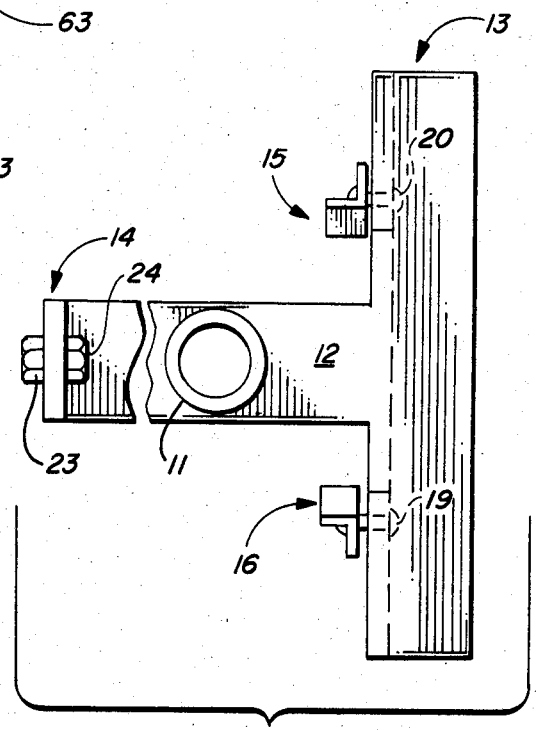
Fig-4
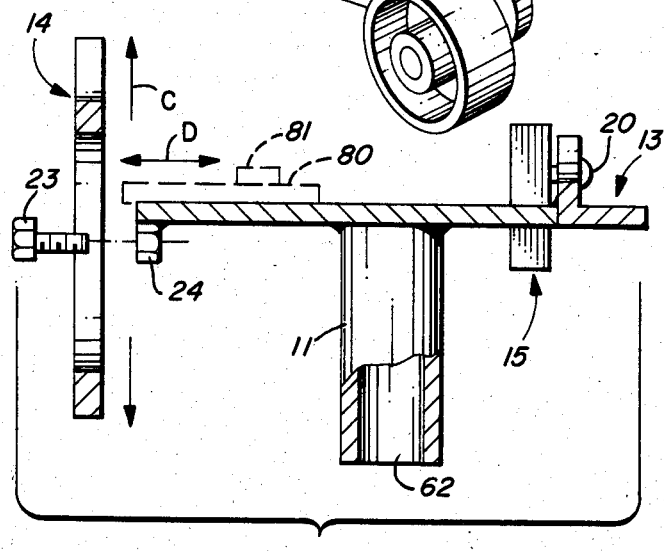
Fig-2
Fig-3

APPARATUS FOR REMOVING TRUCK BRAKE DRUM

This invention relates to apparatus for maintenancing brake drums carried on the wheel spindle axle of a vehicle.

More particularly, the invention relates to apparatus for removing a truck brake drum from the spindle of a wheel axle assembly and for replacing the bearings and seals in the brake drum prior to reinstalling the drum on the spindle.

In another respect, the invention pertains to brake drum maintenancing apparatus which permits a brake drum to be horizontally drawn off of and away from the spindle of a wheel axle assembly without allowing the drum to tilt as it is moved away from the spindle.

In a further respect, the invention relates to brake drum maintenancing apparatus which permits a brake drum to be removed from the spindle of a wheel axle assembly without damaging bearings or bearing seals carried inside the brake drum.

In still another respect, the invention relates to brake drum maintenancing apparatus which markedly reduces the time required to remove a brake drum from the spindle of a wheel axle assembly, required to replace bearings and seals in the drum, and, required to reinstall the brake drum on the spindle.

In yet still a further respect, the invention relates to brake drum maintenancing apparatus which greatly minimizes or eliminates the likelihood that a mechanic will slip a spinal disk or suffer other debilitating injuries when removing a brake drum from the spindle of a wheel axle assembly.

Vehicle brake drums are periodically removed from the spindle axles of a vehicle to evaluate the condition of the brake shoes and of seals and bearings mounted in the brake drum. A mechanic, in order to remove a brake drum, detaches the wheel rim from the drum and removes the cotter pin or other fastening means maintaining the brake drum in position on the spindle. The mechanic then grasps the drum and pulls it straight out along a horizontal axis and away from the spindle. It is very important that the drum not be permitted to tilt as it is being drawn off of the spindle. Even a slight tilting of the drum while it is being removed can damage bearings and bearing seals mounted in the drum.

Several long existing problems are associated with the removal and reinstallation of brake drums utilized on moving vans and other types of trucks. Truck brake drums are relatively heavy, usually weighing ninety-five to one hundred and five pounds, and more importantly, have an acentric center of gravity. The rear portion of the cylindrical body of a conventional brake drum is largely hollowed out to form a cylindrical cavity which slides over the brake shoes carried on the spindle of a wheel axle assembly. As a consequence, the greater proportion of the weight of a truck brake drum is located forwardly toward the hub and lug bolts of the brake drum. This weight imbalance and the substantial weight of the drum makes it very difficult for a mechanic to pull a drum off of a truck spindle without permitting the drum to tilt upwardly or downwardly and damage bearings or bearing seals in the drum. Consequently, brake drum bearing seals are, as a matter of good maintenance practice, generally always replaced when a truck brake drum is removed from a spindle. In many cases seals or bearings would not have to be replaced if they had not been damaged during removal of the brake drum from the spindle.

Another problem which derives from the heavy weight and acentric center of gravity of truck brake drums is that mechanics frequently slip a disk in their spinal column or suffer other debilitating injuries while attempting to carefully grasp and remove brake drums from the spindle axle of a truck.

Further, since truck brake drums are awkward to handle and normally require that seals or bearings be replaced on removal of the drum from a spindle, the time required to maintenance the drums is unnecessarily increased. After a tire rim has been detached from a drum, it normally requires twenty minutes to remove the drum from its spindle, to replace the seals and bearings, and to reinstall the drum on the wheel spindles.

Accordingly, it would be highly desirable to provide brake drum maintenance apparatus which would enable a brake drum to be quickly and conveniently removed from a spindle axle without permitting the drum to upwardly or downwardly tilt, would reduce the time required to maintenance a brake drum, and, would eliminate the risk that a mechanic would injure his back while removing or installing a brake drum.

Therefore, it is a principal object of the invention to provide improved apparatus for maintenancing vehicle brake drums.

Another object of the invention is to provide improved brake drum maintenancing apparatus for removing a truck brake drum from the spindle of a wheel axle, for removing bearings and seals from the brake drum, and for replacing the brake drum on the spindle.

A further object of the invention is to provide improved brake drum maintenancing apparatus which permits a brake drum to be pulled off of and away from the spindle of a wheel axle assembly in fixed orientation along an imaginary horizontal axis.

Still another object of the instant invention is to provide improved brake drum maintenancing apparatus which substantially reduces the time required to maintenance a brake drum and which greatly reduces the likelihood that a mechanic will suffer a debilitating injury while removing a brake drum from the spindle axle of a wheel assembly.

Yet a further object of the instant invention is to provide improved brake drum maintenance apparatus which permits a brake drum to be drawn away from the spindle of a wheel axle assembly without damaging bearings or bearing seals carried inside the brake drum.

These and other, further and more specific objects and advantages of the invention will be apparent to those skilled in the art from the following detailed description thereof, taken in conjunction with the drawings, in which:

FIG. 1 is a perspective view of apparatus constructed in accordance with the principles of the invention and illustrating the mode of operation thereof;

FIG. 2 is a side section view of the apparatus of FIG. 1 taken along section line 2—2 and further illustrating construction details thereof;

FIG. 3 is a bottom view of the apparatus of FIG. 1; and,

FIG. 4 is an enlarged front view of a portion of the apparatus of FIG. 1.

Briefly, in accordance with my invention, I provide improved cradle apparatus for maintenancing a brake drum. The brake drum includes a generally cylindrical body member having an outer surface, an imaginary centerline passing therethrough, a geometric centerpoint generally lying on said imaginary centerline, and an acentric center of gravity located at an imaginary point spaced apart from the geometric centerpoint of the cylindrical body member. The brake drum also includes a cylindrical aperture formed through the body member and having a centerline generally corresponding to the imaginary centerline of the cylindrical body member. The cylindrical aperture is shaped and dimensioned to permit at least a portion of the spindle to pass therethrough. The brake drum further includes means for attaching a wheel rim thereto and includes a hub. The improved cradle apparatus of the invention includes a base; a first support member attached to the base and shaped, contoured and dimensioned such that when the brake drum is positioned on the cradle apparatus the outer surface of the brake drum contacts the apparatus at at least two separate points on the outer surface of the brake drum; and, a second support member attached to the base and adapted to contact and support said brake drum at a third point thereon. The first and second support members can be shaped, contoured and dimensioned to contact the brake drum such that the center of gravity of the cylindrical body lies between the third contact point and at least one of the two points at which the outer surface contacts the first support member.

Turning now to the drawings, which depict the presently preferred embodiment and best mode of the invention for the purpose of illustrating the practice thereof and not by way of limitation of the scope of the invention, and in which like reference characters correspond to like elements throughout the several views, FIGS. 1 to 4 illustrate apparatus constructed in accordance with the principles of the invention and including a T-shaped base having hollow upright cylindrical member 11 and horizontally oriented panel member 12. Elongate L-shaped member 13 is attached to one end of panel member 12 while vertically oriented panel member 14 is adjustably secured to the other end of panel member 12. L-shaped arms 15, 16 are adjustably attached to panel 17 of L-shaped member 13 by bolts 19, 20. When bolts 19, 20 are loosened, arms 15 can be pivotally adjusted as indicated by arrow A in FIG. 4. After each arm 15, 16 is rotated in the directions of arrow A to a desired position, bolts 19, 20 are tightened to maintain arms 15, 16 in their respective desired positions. Arms 15, 16 can be provided with elongate grooves 90 so that members 15, 16 can be vertically adjusted as indicated by arrows B in FIGS. 1 and 4.

In FIG. 1 the brake drum is indicated by dashed lines 30 and includes generally cylindrical body member 40 having hub 41 attached thereto. The rear portion of body member 40 is hollowed out to form cylindrical aperture 42 therein. Aperture 42 is sized to fit over brake shoes which are carried on the spindle of a wheel axle assembly. A conventional brake drum—spindle wheel axle assembly is illustrated in FIG. 8-2, page 37 of Section 2: Brakes & Wheels in the *Rabbit/Scirocco Service Manual,* 1980 *Gasoline Models including Pickup Truck* by Robert Bentley (1980), Library of Congress Catalog Card No. 79-57284. In FIG. 8-2 the "stub axle" is the spindle.

When bolt 23 is loosened slot 22 formed through member 14 permits member 14 to be vertically adjusted as indicated by arrows C in FIG. 1. After member 14 is adjusted to the desired position bolt 23 is threaded into nut 24 to fixedly detachably secure member 14 in the desired position. Nut 24 is welded to member 12. U-shaped notch 25 is formed in the upper end of member 14 and is sized to receive a bolt outwardly extending from hub 41 of brake drum 30.

In FIG. 1 dashed line 50 represents the centerline of cylindrical body member 40 and of cylindrical hub 41. When brake drum 30 is positioned on and being supported by the cradle apparatus of FIGS. 1 to 4, centerline 50 is generally horizontal and the outer cylindrical surface of member 40 contacts and rests against surface 60, 61 of arms 15, 16.

Cylindrical aperture 62 of member 11 is shaped and dimensioned to slidably receive an upwardly projecting cylindrical post (not shown) mounted on floor jack 63. When aperture 62 is slid over the upwardly projecting post of floor jack 63, the cradle apparatus of FIGS. 2 and 3 is positioned as shown in FIG. 1 and can be raised or lowered with jack 63.

In use, the rear wheel of a vehicle is raised from the ground with a jack and the wheel rim detached from the brake drum. After the wheel rim is detached the cotter pin or other fastening means used to maintain the brake drum on the spindle of the wheel axle assembly is removed. Floor jack 63 is positioned beneath the brake drum and the cradle apparatus of FIG. 1 is raised and the positions of members 14, 15, 16 adjusted until the outer surface of member 40 rests against surfaces 60, 61 of members 15, 16 and a threaded bolt (not shown) outwardly extending from hub 41 passes through and rests against the bottom of U-shaped slot 25. A nut is threaded on the end of the hub bolt horizontally extending through slot 25 past member 14 and is tightened against member 14 to force member 14 against hub 41 and prevent the threaded hub bolt in notch 25 from being raised upwardly out of slot 25. When the brake drum is resting in the cradle apparatus of the invention as depicted in FIG. 1, the bottom of the outer surface of body member 40 preferably does not rest against member 12. If member 30 does not contact panel member 12, brake drum 30 rests on and is supported by the cradle apparatus at three separate points: at surfaces 60, 61 of fingers 15, 16 and at U-shaped groove 25 of member 14.

After floor jack 63 is utilized to position the cradle apparatus of the invention adjacent brake drum 30 as illustrated in FIG. 1 and a nut is threaded on the hub bolt passing through notch 25 to secure member 14 against hub 14, floor jack 63 is slowly pulled away from the axle assembly in the direction of arrow F in FIG. 1 to draw the brake drum off of and away from the spindle of the axle assembly. Arrow F is generally parallel to the longitudinal axis of the spindle. The apparatus of the invention insures that the brake drum will be drawn off of the spindle without allowing the brake drum to tilt. Once the floor jack has been used to move brake drum 30 away from the spindle (not shown), the bearings and bearing seals in the brake drum can, if necessary, be removed and replaced while the drum rests on the cradle apparatus. After the bearings and bearing seals have been replaced and the brake pads and other brake components examined and replaced as required, floor jack 63 is wheeled toward the vehicle to reposition brake drum 30 on the spindle. After the brake drum is in position on the spindle, the nut on the hub bolt passing through slot 25 is loosened and floor jack 63 operated to lower the cradle apparatus away from brake drum 30. The cotter pin or other fastening means used to maintain brake drum 30 in position on the wheel spindle is replaced, and the wheel rim attached to the brake drum. Other mechanical means may be used in place of jack 63 to raise and lower the cradle apparatus to and from its supporting position adjacent brake drum 30.

As illustrated in FIG. 2, the cradle apparatus can include a panel member 80 which slides over member 12 in the directions indicated by arrows D. A bolt 81 would fixedly tighten member 80 in position against member 12 once the desired position of member 80 had been obtained. Member 80 would be utilized to permit the lateral position of member 14 to be adjusted. If member 80 were included in the cradle apparatus, nut 24 would be welded to the end of member 80 nearest member 14 such that nut 24 could receive the threaded end of nut 23.

The geometric center of body member 30 generally lies along centerline 50 at a point S halfway between imaginary vertical planes passing through circular edges 70, 71 of body member 40 (FIG. 1). Since the rear portion of brake drum 30 is hollowed out to form aperture 42, the center of gravity of body member 30 is, when member 30 is generally horizontally oriented as in FIG. 1, at point T along centerline 50. Point T is between geometric center S and a vertical plane passing through circular edge 90 of hub 41. In order for the cradle apparatus of the invention to support brake drum 30 in the most stable manner, it is preferred that the acentric center of gravity T be between the point at which member 14 contacts and supports the brake drum and the points at which fingers 15, 16 contact and support body member 40. If the center of gravity T is not between fingers 15, 16 and member 14, the apparatus is inherently unstable.

As indicated by arrows G in FIG. 1, member 11 can be rotated when positioned on the upwardly projecting cylindrical post of jack 63. Being able to rotate member 11, and, consequently, the entire cradle apparatus, facilitates the proper positioning of the apparatus adjacent drum 30.

When the cradle apparatus of the invention is utilized, a brake drum can be removed from its spindle, the bearings and seals in the drum replaced, and the drum reinstalled on the spindle in five to seven minutes.

Having described my invention in such terms as to enable those skilled in the art to understand and practice it, and having identified the presently preferred embodiments thereof, I claim:

1. In combination with a brake drum carried on the spindle of a wheel axle assembly of a vehicle, the brake drum being secured to the spindle with fastening means and normally carrying a wheel rim, said rim being removed from said brake drum, said brake drum including
a generally cylindrical hollow member having
   an outer surface,
   an imaginary centerline passing therethrough and generally parallel to the ground,
   a geometric centerpoint generally lying on said imaginary centerline, and
   an acentric center of gravity located at an imaginary point spaced apart from the geometric centerpoint of said cylindrical body member,
a cylindrical aperture formed in said body member and having a centerline generally corresponding to said imaginary centerline of said cylindrical body member, said aperture being shaped and dimensioned to permit at least a portion of said spindle to pass therethrough,
a hub connected to said body member, and
at least one nut and bolt for attaching said wheel rim to said hub, said bolt being secured in and outwardly extending from said hub,
cradle apparatus positioned beneath and contacting said brake drum, said cradle apparatus including
   (a) a stand having a plurality of ground engaging wheels,
   (b) a base mounted on said stand for vertical displacement thereon,
   (c) a first support member attached to said base and including a pair of spaced apart upstanding arms,
   (d) a second upstanding support member attached to said base and adapted to receive and support said hub bolt
said first and second support members being shaped and dimensioned such that said brake drum is supported at only three points by said cradle apparatus,
   (e) said hub bolt is supported by said second member, and
   (f) said outer surface of said cylindrical body member only contacts and is supported by said cradle apparatus by bearing against each of said arms of said first support member,
and said body member and brake drum are maintained in position above and spaced apart from said base
said cradle apparatus permitting said brake drum to be moved free of said spindle without tilting said brake drum by removing said fastening means securing said brake drum to said spindle and displacing said cradle apparatus stand in a generally horizontal direction of travel away from said vehicle to remove said brake drum from said spindle.

2. The combination of claim 1 wherein
(a) said second upstanding support member includes an upwardly opening U-shaped groove; and,
(b) said upstanding arms of said first support member each have an inner surface which slopes away from the space between said arms;
said upwardly opening U-shaped groove and said inner surfaces of said upstanding arms of said first support member being shaped and dimensioned such that
(c) said sloped inner surfaces of said upstanding arm each contact and support said outer surface of said body member therebetween;
(d) said U-shaped groove receives and supports said bolt extending from said hub;
(e) said imaginary centerline of said hollow body member is generally horizontal;
(f) said geomtric centerpoint and acentric center of gravity are positioned between said U-shaped groove and said upstanding arm of said first support member; and,
(g) said brake drum is stabilized and supported on said cradle apparatus
   (i) while permitting said brake housing to be freely lifted upwardly from said cradle apparatus after said fastening means securing said brake drum to said spindle are removed and said cradle apparatus stand is displaced in a generally horizontal direction of travel away from said vehicle to free said brake drum from said spindle, and
   (ii) without requiring the tightening of bolts and other fastening means to secure said brake housing in stable position on said cradle apparatus.

* * * * *